US008271360B1

(12) United States Patent
Schmier et al.

(10) Patent No.: US 8,271,360 B1
(45) Date of Patent: Sep. 18, 2012

(54) SYSTEM AND METHOD FOR AUTOMATIC APPROVAL OF DIRECT DEPOSIT PAYROLL LIMIT INCREASES

(75) Inventors: Terri Miles Schmier, San Mateo, CA (US); Lee Louise Diller, Reno, NV (US)

(73) Assignee: Intuit Inc., Mountain View, CA (US)

( * ) Notice: Subject to any disclaimer, the term of this patent is extended or adjusted under 35 U.S.C. 154(b) by 949 days.

(21) Appl. No.: 11/689,089

(22) Filed: Mar. 21, 2007

(51) Int. Cl.
*G07B 17/00* (2006.01)
*G07F 19/00* (2006.01)
(52) U.S. Cl. .................................. 705/30; 379/88.18
(58) Field of Classification Search .................. 235/385, 235/472.01, 379, 380; 379/88.18, 201.05; 705/30, 35, 42, 45
See application file for complete search history.

(56) References Cited

U.S. PATENT DOCUMENTS

| 7,123,698 B1* | 10/2006 | Clifford et al. | 379/88.18 |
| 2005/0086136 A1* | 4/2005 | Love et al. | 705/30 |
| 2006/0080251 A1* | 4/2006 | Fried et al. | 705/42 |
| 2008/0027844 A1* | 1/2008 | Little et al. | 705/35 |

FOREIGN PATENT DOCUMENTS
WO   WO 9522113 A1 *  8/1995

OTHER PUBLICATIONS

Hoganson, John A.. "Credit Risk Alarms Cautious Banks on Transfers Through the ACH." Corporate Cashflow Dec. 1, 1989: ABI/INFORM Global, ProQuest. Web. May 24, 2012.*

* cited by examiner

*Primary Examiner* — Matthew Gart
*Assistant Examiner* — Rokib Masud
(74) *Attorney, Agent, or Firm* — McKay and Hodgson, LLP; Philip McKay; Sean P. Lewis

(57) ABSTRACT

A system and method for automatic approval of direct deposit payroll limit increases includes a computing system implemented process for automatic approval of direct deposit payroll limit increases whereby a payroll management system provider establishes qualification criteria for automatic approval of direct deposit payroll increases. Once the qualification criteria are defined, the qualification criteria are stored. Then, when a customer business requests a direct deposit payroll that exceeds at least one of the customer's current direct deposit payroll limits, the process for automatic approval of direct deposit payroll limit increases analyzes the requested direct deposit payroll data and/or customer history data and compares this data with the qualification criteria. If the present direct deposit payroll funds request meets the qualification criteria, the direct deposit payroll limit for the customer business is automatically increased and the direct deposit payroll funds request is approved without further action/input from the customer business.

23 Claims, 2 Drawing Sheets

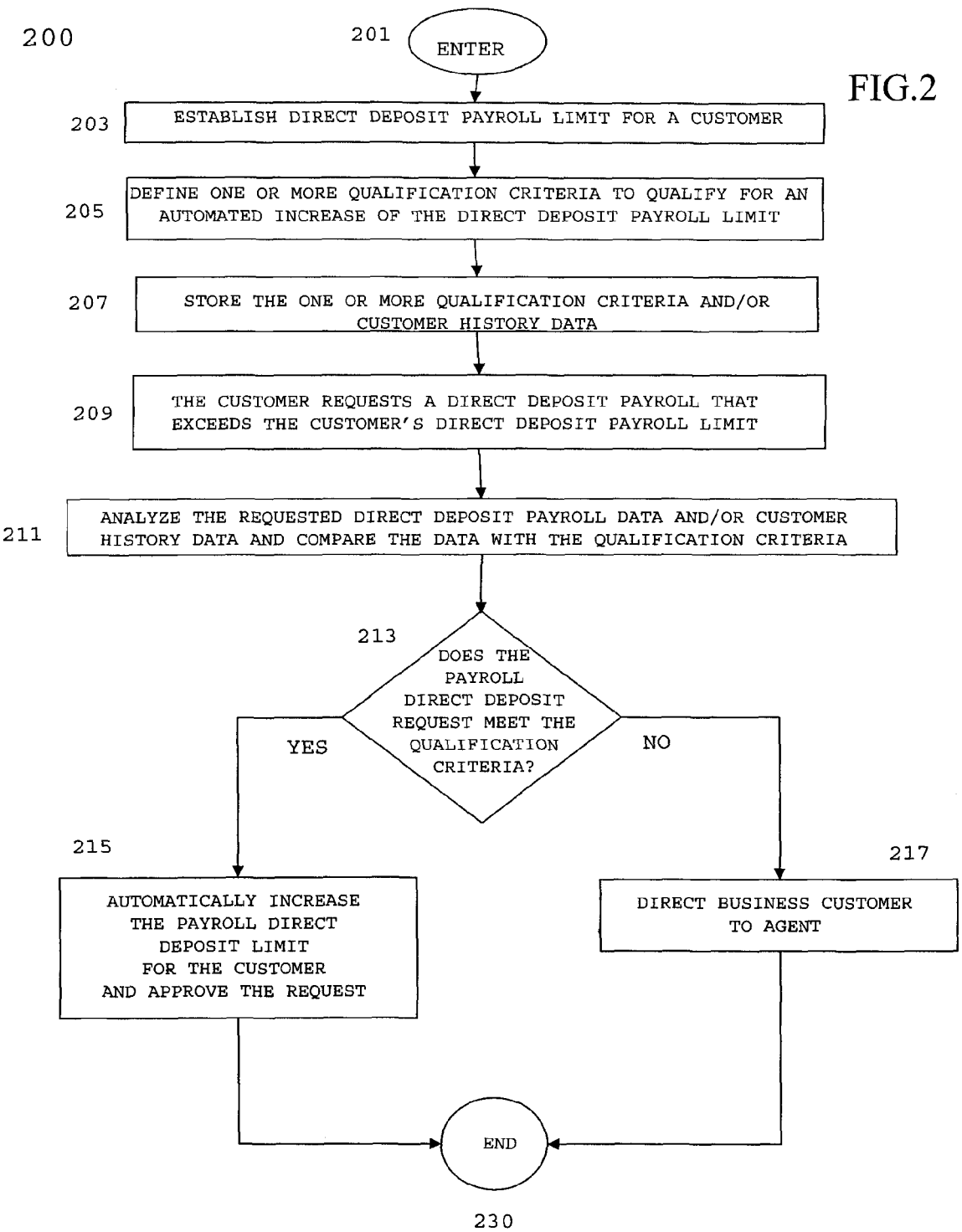

SYSTEM AND METHOD FOR AUTOMATIC APPROVAL OF DIRECT DEPOSIT PAYROLL LIMIT INCREASES

BACKGROUND

Many businesses use computing system implemented payroll management systems offered by third-party payroll management system providers to perform various payroll related functions for the business. Herein, businesses that are customers of the payroll management system providers and/or are users of the computing system implemented payroll management systems are also referred to interchangeably as "customers" or "customer businesses".

Typically, computing system implemented payroll management systems perform the various payroll functions for a customer business based on data provided by the customer business toward the end of each pay period. One of the payroll functions currently offered by payroll management system providers is direct deposit service. Using a typical direct deposit service, an employee of the customer business does not receive a traditional compensation check, but rather has his or her compensation automatically deposited into a bank account designated by the employee. Direct deposit service represents a significant convenience to the employee and, in many cases, to the employer/customer business as well.

As noted direct deposit service is often very convenient for both the customer business and its employees. However, direct deposit service can also present significant financial risks to the payroll management system providers. This is because in order to provide an accurate payroll, and for the convenience of the customer business, there is typically a relatively short time frame between when the customer business submits the payroll information to the payroll management system provider and when funds representing the direct deposit payroll must be transferred to the individual accounts of the employees of the customer business. In many cases this time frame is less than two banking days. As a result, in many cases, while funds representing the direct deposit payroll are theoretically transferred from the customer businesses account to the payroll management system provider, and then from the payroll management system provider's account to the individual employee accounts, these funds are often actually transferred to the individual employee accounts from the payroll management system provider before the transaction transferring the direct deposit payroll funds from the customer business to the payroll management system provider is actually verified and completed. As a result, in many cases, the payroll management system provider is essentially floating the direct deposit payroll funds to the employees on behalf of the customer business.

In the vast majority of instances, the system described above works well for all parties involved. However, if, for any reason, the customer business has insufficient funds to actually cover the direct deposit payroll, the payroll management system provider must then attempt to recover the funds from the customer business. In most instances, insufficient funding on the part of the customer business is a temporary state and the funds are readily recovered by the payroll management system provider. However, in some instances, the customer business purposely seeks to defraud the payroll management system provider.

In order to protect themselves from these few malicious individuals, most payroll management system providers currently impose direct deposit payroll limits on their customer businesses. By imposing these limits, the payroll management system providers can cap their losses in the event of a fraudulent transaction. However, many customer businesses need to occasionally exceed direct deposit payroll limits for entirely legitimate reasons such as, but not limited to, payment of periodic bonuses, the addition of new employees, or any one of numerous other "honest" reasons that a direct deposit payroll request may fluctuate and/or exceed a defined limit. Currently, if a customer business submits a direct deposit payroll request that exceeds the direct deposit payroll limit, the direct deposit payroll request is typically denied and/or the customer business is sent an error message. Typically, the customer business must then manually contact, e.g., call or otherwise contact, an agent for the payroll management system provider and request a direct deposit payroll limit increase. However, as noted above, direct deposit payroll requests are typically made very close to the time the payroll funds are actually needed in order to pay employees on the designated payday. Consequently, using current systems, a customer business is often forced to frantically try and contact the agent for the payroll management system provider at the last minute before the payroll deadline is missed. The problem is further amplified by the fact that many businesses have the same paydays, such as on the $1^{st}$ and $15^{th}$ of each month. Consequently, in many cases, the agents for the payroll management system provider are flooded with numerous requests for direct deposit payroll limit increases in more or less the same time frame. As a result, the agents ability to respond to the customer businesses is often further delayed by sheer volume of requests, thereby further exasperating the problem for the customer business.

SUMMARY

In accordance with one embodiment, a system and method for automatic approval of direct deposit payroll limit increases provides a payroll service provider the capability to establish qualification criteria for automatic approval of direct deposit payroll increases and to automatically approve direct deposit payroll increases for a customer business when the qualification criteria are met.

In one embodiment, a system and method for automatic approval of direct deposit payroll limit increases includes a computing system implemented process for automatic approval of direct deposit payroll limit increases whereby a payroll service provider establishes a direct deposit payroll limit for a given customer. In one embodiment, the payroll service provider then defines one or more qualification criteria that must be met in order for a customer business, and a requested direct deposit payroll, to be eligible for an automated increase of the direct deposit payroll limit. In one embodiment, the qualification criteria include, but are not limited to, one or more of the following: the number of direct deposit payroll events involving the customer business being greater than or equal to a defined number, thereby establishing that the customer business making the direct deposit payroll request is known and/or has been a customer for a defined period of time; and/or the number of insufficient fund events over a defined period of time is less than or equal to a defined number, thereby establishing the reliability of the customer business; and/or the amount of the total direct deposit payroll being requested, including the present request, being less than or equal to a defined maximum value, thereby limiting the risk to the defined maximum value; and/or the amount of the total direct deposit payroll being requested, including the present request, being less than or equal to a defined multiple of the current direct deposit payroll limit, thereby establishing a realistic and reasonable increase in addition to limiting the risk; and/or the amount of the direct deposit payroll being requested for an individual account, including the present request, being less than or equal to a defined maximum value, thereby limiting the risk to the defined maximum value; and/or the amount of the direct deposit payroll being requested for an individual account, including the present request, being less than or equal to a defined multiple of the current individual account direct deposit payroll limit, thereby establishing a realistic and reasonable increase in addition to limiting the risk; and/or any other qualification criteria as defined by the payroll service provider.

In one embodiment, once the qualification criteria are defined, the qualification criteria are stored. In one embodiment, in addition to the qualification criteria, any other data representing the customer business, including customer business history and financial data, is also stored. In one embodiment, once the qualification criteria and/or customer history data are stored, when the customer business requests a direct deposit payroll that exceeds the customer's current direct deposit payroll limit, the process for automatic approval of direct deposit payroll limit increase accesses the qualification criteria and customer history data and analyzes the requested direct deposit payroll data and/or customer history data to compare the data with the qualification criteria.

In one embodiment, if the present direct deposit payroll request meets the qualification criteria, the direct deposit payroll limit for the customer business is automatically increased and the direct deposit payroll request is approved without further input from the customer business. In one embodiment, if the qualification criteria are met, the customer business is given a new direct deposit payroll limit that is larger than the requested direct deposit payroll by a defined buffer amount such as, in one embodiment, ten percent. In one embodiment, once the direct deposit payroll limit increase is approved, a notation is made in the customer business's electronic file so that agents and other parties associated with the payroll service provider can readily see that the direct deposit payroll limit has been increased. This helps avoid multiple increases in the same timeframe.

In one embodiment, if the present direct deposit payroll request does not meet the qualification criteria, the direct deposit payroll request is denied; the customer business is notified and/or directed to an agent of the payroll management system provider by any means currently used in the art.

Using the system and method for automatic approval of direct deposit payroll limit increases disclosed herein, a payroll service provider is given the capability to automatically approve direct deposit payroll limit increases for proven customer businesses. Consequently, the proven customer business is provided with better service, while at the same time the risk to the payroll service provider is not significantly increased. In addition, the inventors have found that implementation of one embodiment of the system and method for automatic approval of direct deposit payroll limit increases disclosed herein resulted in a greater than 60 percent decrease in the number of service calls made to the payroll service provider for the purpose of increasing direct deposit payroll limits. Consequently payroll service providers implementing the system and method for automatic approval of direct deposit payroll limit increases disclosed herein, will often be able to significantly decrease the number of agents required to service their customer businesses, thereby significantly decreasing their operating costs.

As discussed in more detail below, using the below embodiments, with little or no modification and/or user input, there is considerable flexibility, adaptability, and opportunity for customization to meet the specific needs of various users under numerous circumstances.

BRIEF DESCRIPTION OF THE DRAWINGS

FIG. 2 is a flow chart depicting a process for automatic approval of direct deposit payroll limit increases in accordance with one embodiment.

Figure 1:
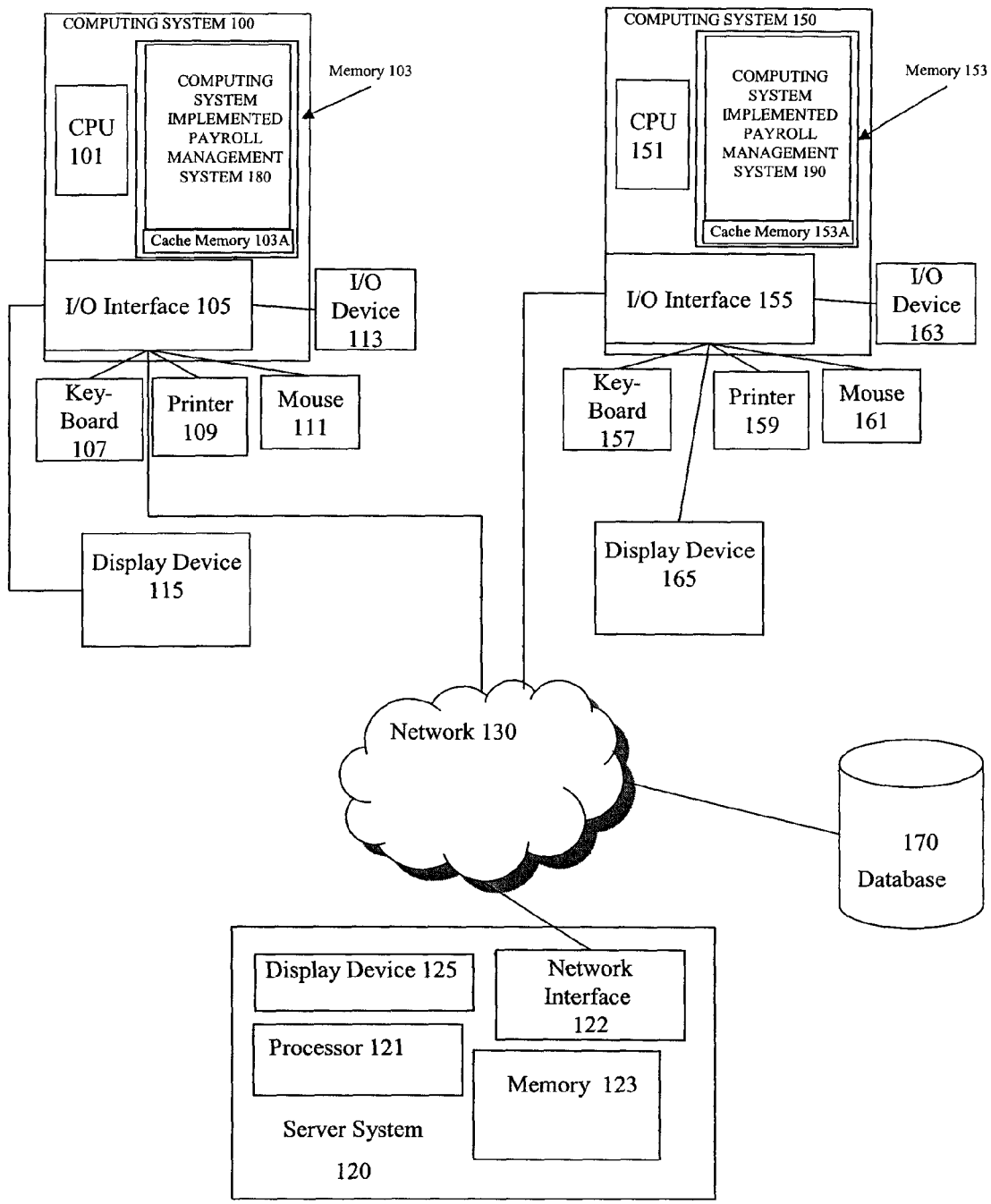
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a system and method for automatic approval of direct deposit payroll limit increases provides a payroll service provider the capability to establish qualification criteria for automatic approval of direct deposit payroll increases and to automatically approve direct deposit payroll increases for a customer business when the qualification criteria are met.

In one embodiment, a system and method for automatic approval of direct deposit payroll limit increases includes a computing system implemented process for automatic approval of direct deposit payroll limit increases (200 in FIG. 2) whereby a payroll service provider establishes a direct deposit payroll limit for a given customer. In one embodiment, the payroll service provider defines one or more qualification criteria that must be met in order for a customer business, and a requested direct deposit payroll, to be eligible for an automated increase of the direct deposit payroll limit. In one embodiment, the qualification criteria include, but are not limited to, one or more of the following: the number of direct deposit payroll events involving the customer business being greater than or equal to a defined number, thereby establishing that the customer business making the direct deposit payroll request is known and/or has been a customer for a defined period of time; and/or the number of insufficient fund events over a defined period of time is less than or equal to a defined number, thereby establishing the reliability of the customer business; and/or the amount of the total direct deposit payroll being requested, including the present request, being less than or equal to a defined maximum value, thereby limiting the risk to the defined maximum value; and/or the amount of the total direct deposit payroll being requested, including the present request, being less than or equal to a defined multiple of the current direct deposit payroll limit, thereby establishing a realistic and reasonable increase in addition to limiting the risk; and/or the amount of the direct deposit payroll being requested for an individual account, including the present request, being less than or equal to a defined maximum value, thereby limiting the risk to the defined maximum value; and/or the amount of the direct deposit payroll being requested for an individual account, including the present request, being less than or equal to a defined multiple of the current individual account direct deposit payroll limit, thereby establishing a realistic and reasonable increase in addition to limiting the risk; and/or any other qualification criteria as defined by the payroll service provider.

In one embodiment, once the qualification criteria are defined, the qualification criteria are stored. In one embodiment, in addition to the qualification criteria, any other data representing the customer business, including customer business history and financial data, is also stored. In one embodiment, once the qualification criteria and/or customer history data are stored, when the customer business requests a direct deposit payroll that exceeds the customer's current direct deposit payroll limit, the process for automatic approval of direct deposit payroll limit increase accesses the qualification criteria and customer history data and analyzes the requested direct deposit payroll data and/or customer history data to compare the data with the qualification criteria.

In one embodiment, if the present direct deposit payroll request meets the qualification criteria, the direct deposit payroll limit for the customer business is automatically increased and the direct deposit payroll request is approved without further input from the customer business. In one embodiment, if the qualification criteria are met, the customer business is given a new direct deposit payroll limit that is larger than the requested direct deposit payroll by a defined buffer amount such as, in one embodiment, ten percent. In one embodiment, once the direct deposit payroll limit increase is approved, a notation is made in the customer business's electronic file so that agents and other parties associated with the payroll service provider can readily see that the direct deposit payroll limit has been increased. This helps avoid multiple increases in the same timeframe.

In one embodiment, if the present direct deposit payroll request does not meet the qualification criteria, the direct deposit payroll request is denied, the customer business is notified and directed to an agent of the payroll management system provider by any means currently used in the art.

Using the system and method for automatic approval of direct deposit payroll limit increases disclosed herein, a payroll service provider is given the capability to automatically approve direct deposit payroll limit increases for proven customer businesses. Consequently, the customer business is provided with better service, while at the same time the risk to the payroll service provider is not significantly increased. In addition, the inventors have found that implementation of one embodiment of the system and method for automatic approval of direct deposit payroll limit increases disclosed herein resulted in a greater than 60 percent decrease in the number of service calls made to the payroll service provider for the purpose of increasing direct deposit payroll limits. Consequently payroll service providers implementing the system and method for automatic approval of direct deposit payroll limit increases disclosed herein, will often be able to significantly decrease the number of agents required to service their customer businesses, thereby significantly decreasing their operating costs.

Some embodiments may be implemented in a computing system including a conventional computing system running a conventional operating system such as those distributed by Microsoft Corporation of Redmond Wash.; Apple Computer Inc. of Cupertino Calif.; any Unix operating system; any Linux operating system; the Palm OS series of operating systems; or any other operating system designed to generally manage operations on a computing system, whether known at the time of filing or as developed later. Some embodiments may be implemented in a mobile computing system running mobile operating systems such as Symbian® OS, Windows® Mobile, or any other operating system designed to generally manage operations on a mobile computing system, whether known at the time of filing or as developed later. As described more fully below, embodiments can be implemented on computing systems other than a conventional computing system such as, for example, a personal digital assistant, a cell phone, or other computing system capable of processing computer readable data, whether known at the time of filing or as developed later. As defined herein, computing systems also include those in which one or more computing resources (hardware or software) are located remotely and accessed via network, such as a Local Area Network (LAN), Wide Area Network (WAN), a public network, such as the Internet, a private network, a combination of network types, a computing system bus, or any other electronic medium in which data may be exchanged between one computing system and one or more other computing system(s), whether known at the time of filing or as developed later. Embodiments may be included as add-on or plug-in software for existing software programs, packages or applications, and embodiments may be a feature of an application that is bundled with a computing system or sold/provided separately. Some embodiments may also be implemented as functionality embedded in hardware devices and systems.

Output generated by one or more embodiments can be displayed on a display screen, transmitted to a remote device, stored on any database, computer server or other storage mechanism, printed, or used in any other way. In addition, in some embodiments, processes and/or systems described herein may make use of input provided to the computer device implementing a process and/or application, discussed herein, via user interface devices such as a keyboard, mouse, touchpad, or any other device capable of providing user input to a computing system or for translating user actions into computing system operations, whether known at the time of filing or as developed later.

Hardware System Architecture

FIG. 1 is a block diagram of an exemplary hardware architecture for implementing one embodiment of a system and method for automatic approval of direct deposit payroll limit increases, such as exemplary process 200 discussed herein, that includes: a computing system 100, e.g., a first computing system; a computing system 150, e.g., a second computing system; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part of, one or more computing system implemented payroll management systems 180 stored, in whole, or in part, therein, that is a parent system for, is used by, or includes, as discussed below, a process for automatic approval of direct deposit payroll limit increases, such as exemplary process 200 discussed below.

Computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, a process for automatic approval of direct deposit payroll limit increases and/or a computing system implemented payroll management system can be loaded, in whole, or in part, into computing system 100 via I/O device 113, such as from a CD, DVD, floppy disk or other medium.

In one embodiment, computing system 100 is a computing system used and/or accessible by a payroll management system provider. In one embodiment, computing system 100 is a computing system used and/or accessible by a customer business. In one embodiment, computing system 100 is a computing system used and/or accessible by any designated third party.

Similarly, computing system 150 typically includes a CPU 151, an input/output (I/O) interface 155, and a memory system 153, including cache memory 153A. In one embodiment, memory system 153 includes all, or part of, one or more computing system implemented payroll management systems 190 stored, in whole, or in part, therein, that is a parent system for, is used by, or includes, as discussed below, a process for automatic approval of direct deposit payroll limit increases.

Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed. As discussed in more detail below, in one embodiment, a process for automatic approval of direct deposit payroll limit increases and/or a computing system implemented payroll management system, can be loaded, in whole, or in part, into computing system 150 via I/O device 163, such as from a CD, DVD or floppy disk.

In one embodiment, computing system 150 is a computing system used and/or accessible by a payroll management system provider. In one embodiment, computing system 150 is a computing system used and/or accessible by a customer business. In one embodiment, computing system 150 is a computing system used and/or accessible by any designated third party.

Also shown in FIG. 1 is exemplary database 170. In one embodiment, database 170 is a designated server system or computing system, or a designated portion of one or more server systems or computing systems, such as computing systems 100, 150 and 120 or a distributed database. In one embodiment, database 170 is a dedicated mass storage device implemented in software, hardware, or a combination of hardware and software. In one embodiment, database 170 is a web-based function. As discussed in more detail below, in one embodiment, a process for automatic approval of direct deposit payroll limit increases, such as exemplary process 200, and/or computing system implemented payroll management systems 180 and 190, are stored in whole, or in part, in database 170.

In one embodiment, database 170 is used and/or accessible by a payroll management system provider. In one embodiment, database 170 is used and/or accessible by a customer business. In one embodiment, database 170 is used and/or accessible by any designated third party.

In one embodiment, computing systems 100 and 150, and database 170, are coupled to a server system 120 through network 130. Server system 120 typically includes a server system display device 125, a server system processor 121, a server system memory 123, and a server system network interface 122. As discussed in more detail below, in one embodiment, a process for automatic approval of direct deposit payroll limit increases and/or a computing system implemented payroll management system are stored and/or operated in whole, or in part, in/on server system 120.

In one embodiment, server system 120 is used and/or accessible by a payroll management system provider. In one embodiment, server system 120 is used and/or accessible by a customer business. In one embodiment, server system 120 is used and/or accessible by any designated third party.

Network 130 can be any network or network system that is of interest to a user such as a Local Area Network (LAN), a Wide Area Network (WAN), a public network, such as the Internet, a private network, a combination of different network types, or other wireless, wired, and/or a wireless and wired combination network capable of allowing communication between two or more computing systems, whether available or known at the time of filing or as later developed. In various embodiments, server system network interface 122 and I/O interfaces 105 and 155 include analog modems, digital modems, a network interface card, a broadband connection, or any other means for communicably coupling computing systems 100 and 150, database 170, and server system 120, via network 130, whether available or known at the time of filing or as later developed.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via a network, as discussed herein. In addition, the particular type of, and configuration of, computing systems 100 and 150, database 170, and server system 120 are not relevant.

As discussed in more detail below, in one embodiment, a process for automatic approval of direct deposit payroll limit increases and/or a computing system implemented payroll management system are stored in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for automatic approval of direct deposit payroll limit increases and/or a computing system implemented payroll management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for automatic approval of direct deposit payroll limit increases and/or a computing system implemented payroll management system is capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 151, or server system processor 121. In one embodiment, execution of a process for automatic approval of direct deposit payroll limit increases and a computing system implemented payroll management system by CPU 101, CPU 151, or server system processor 121, results in the operations of an agent computer process (not shown) and/or a rule computer process (not shown).

In one embodiment, a process for automatic approval of direct deposit payroll limit increases and/or a computing system implemented payroll management system are computer applications or processes implemented and/or run and/or stored, in full, or in part, in, or on, a computer program product. Herein, a computer program product comprises a medium configured to store or transport computer readable code, whether available or known at the time of filing or as later developed. Some examples of computer program products are CDs, DVDs, ROM cards, floppy discs, magnetic tapes, computer hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable from the computing system.

For example, all, or part, of a process for automatic approval of direct deposit payroll limit increases and/or a computing system implemented payroll management system may be stored in a memory that is physically located in a location, such as server system memory 123, or database 170, of FIG. 1, different from a computing system, such as computing systems 100 and/or 150 of FIG. 1, utilizing a process for automatic approval of direct deposit payroll limit increases and/or a computing system implemented payroll management system. In one embodiment, all, or part, of a process for automatic approval of direct deposit payroll limit increases and/or a computing system implemented payroll management system may be stored in a memory that is physically located, separate from the computing system's processor(s), such as CPUs 101 and 151 of FIG. 1, and the computing system processor(s) can be coupled to the memory in a client-server system, such as server system 120 of FIG. 1, or, alternatively, via connection to another computer, such as computing systems 100, 150 of FIG. 1, via modems and analog lines, digital interfaces and a digital carrier line, or wireless or cellular connections.

In one embodiment, the computing systems and/or server systems, such as computing systems 100 and/or 150 and/or server system 120 of FIG. 1, running and/or utilizing and/or storing all, or part, of a process for automatic approval of direct deposit payroll limit increases and/or a computing system implemented payroll management system, discussed herein, is a portable computer, a workstation, a two-way pager, a cellular telephone, a smart phone, a digital wireless telephone, a personal digital assistant, a server computer, an Internet appliance, or any other device that includes components that can execute all, or part, of a process for automatic approval of direct deposit payroll limit increases and/or a computing system implemented payroll management system, discussed herein, in accordance with at least one of the embodiments as described herein. Similarly, in another embodiment, a process for automatic approval of direct deposit payroll limit increases and/or a computing system implemented payroll management system, discussed herein, may be implemented on and/or run and/or stored on a computing system and/or server system that is comprised of multiple different computers, wireless devices, cellular telephones, digital telephones, two-way pagers, personal digital assistants, server computers, or any desired combination of these devices, that are coupled to perform the processes and/or operations as described herein.

Process

Herein, the term user denotes any individual party or organization implementing and/or interfacing with a system and method for automatic approval of direct deposit payroll limit increases and/or a process for automatic approval of direct deposit payroll limit increases as disclosed herein.

In accordance with one embodiment, a system and method for automatic approval of direct deposit payroll limit increases provides a payroll service provider the capability to establish qualification criteria for automatic approval of direct deposit payroll increases and to automatically approve direct deposit payroll increases for a customer business when the qualification criteria are met.

FIG. 2 a flow chart depicting a process for automatic approval of direct deposit payroll limit increases 200 in accordance with one embodiment. Process for automatic approval of direct deposit payroll limit increases 200 begins at ENTER OPERATION 201 of FIG. 2 and process flow proceeds to ESTABLISH DIRECT DEPOSIT PAYROLL LIMIT FOR A CUSTOMER OPERATION 203.

Herein, the term "payroll management system provider" refers to any party offering any level of payroll service, or partial service, to a customer business directly, indirectly, or providing a computing system implemented payroll management system to perform all, or part of, various payroll related functions for the customer business.

Herein, the terms "customer" or "customer business" are used interchangeably to refer to businesses that are customers of the payroll management system provider and/or are users of the computing system implemented payroll management system.

As discussed above, many customer businesses use computing system implemented payroll management systems offered by third-party payroll management system providers to perform various payroll related functions for the business. Typically, computing system implemented payroll management systems perform the various payroll functions for a customer business based on data provided by the customer business toward the end of each pay period.

As also discussed above, one of the payroll functions currently offered by payroll management system providers is direct deposit service. However, as noted above, direct deposit service can present significant financial risks to the payroll management system providers. As discussed above, this is because there is typically a relatively short time frame between when the customer business submits the payroll information to the payroll management system provider and when funds representing the direct deposit payroll must be transferred to the individual accounts of the employees of the customer business. In many cases this time frame is less than two banking days. As a result, in many cases, while funds representing the direct deposit payroll are theoretically transferred from the customer businesses account to the payroll management system provider, and then from the payroll management system provider's account to the individual employee accounts, these funds are often actually transferred to the individual employee accounts from the payroll management system provider before the transaction transferring the direct deposit payroll funds from the customer business to the payroll management system provider is actually verified and completed. As a result, in many cases, the payroll management system provider is essentially floating the direct deposit payroll funds to the employees on behalf of the customer business.

As noted above, in the vast majority of instances, the system described above works well for all parties involved. However, if, for any reason, the customer business has insufficient funds to actually cover the direct deposit payroll, the payroll management system provider must then attempt to recover the funds from the customer business. In most instances, insufficient funding on the part of the customer business is a temporary state and the funds are recovered by the payroll management system provider. However, in some instances, the customer business purposely seeks to defraud the payroll management system provider. As discussed above, in order to protect themselves from these few malicious individuals, most payroll management system providers currently impose direct deposit payroll limits on their customer businesses. In this way, the payroll management system providers can cap their losses in the event of a fraudulent transaction.

In one embodiment, at ESTABLISH DIRECT DEPOSIT PAYROLL LIMIT FOR A CUSTOMER OPERATION 203 the payroll management system provider establishes the direct deposit payroll limits for the reasons discussed above. In one embodiment, the payroll management system provider establishes general limits that are applied as a default to all business customers. In some embodiments, these default limits can be changed and/or customized as needed. In other embodiments, the direct deposit payroll limits are established for each customer business on a case-by-case basis.

In one embodiment, the direct deposit payroll limits have various sub-components and/or provisions. For instance, in one embodiment, the direct deposit payroll limits include limitations on the total direct deposit payroll funds payable within a defined time frame. For instance, as one example, the payroll management system provider may establish a total direct deposit payroll limit of $40,000.00 per week. Consequently, using these limits, the payroll management system provider can place a cap on the total possible loss it might incur in the event of a fraudulent transaction.

In one embodiment, the direct deposit payroll limits include limitations on the amount of funds that can be transferred into any single/individual account within a defined time frame. For instance, as one example, the payroll management system provider may establish a limit of $15,000.00 per two-weeks transferable to any single account. In this way, the payroll management system provider can limit the risk of payments made to a fraudulently created account and/or fictitious/fraudulent employee.

Those of skill in the art will readily recognize that, in other embodiments, various other direct deposit payroll limits can be established by the payroll management system provider at ESTABLISH DIRECT DEPOSIT PAYROLL LIMIT FOR A CUSTOMER OPERATION 203 as desired by the payroll management system provider.

In one embodiment, once the direct deposit payroll limits are established by the payroll management system provider at ESTABLISH DIRECT DEPOSIT PAYROLL LIMIT FOR A CUSTOMER OPERATION 203, process flow proceeds to DEFINE ONE OR MORE QUALIFICATION CRITERIA TO QUALIFY FOR AN AUTOMATED INCREASE OF THE DIRECT DEPOSIT PAYROLL LIMIT OPERATION 205.

As discussed above, the direct deposit payroll limits are established by the payroll management system provider at ESTABLISH DIRECT DEPOSIT PAYROLL LIMIT FOR A CUSTOMER OPERATION 203 to help protect the payroll management system provider from fraudulent activity. However, as also discussed above, many customer businesses need to occasionally exceed direct deposit payroll limits for entirely legitimate reasons such as, but not limited to, payment of periodic bonuses, the addition of new employees, or any one of numerous other reasons that a direct deposit payroll request may fluctuate and/or exceed a defined limit.

In one embodiment, at DEFINE ONE OR MORE QUALIFICATION CRITERIA TO QUALIFY FOR AN AUTOMATED INCREASE OF THE DIRECT DEPOSIT PAYROLL LIMIT OPERATION 205, the payroll management system provider establishes and/or defines qualification criteria for automatic approval of direct deposit payroll increases. In one embodiment the qualification criteria are any criteria that the payroll management system provider determines are indicative of non-problematic, i.e., low risk transactions.

As one example, in one embodiment, one of the qualification criteria is that the number of successful direct deposit payroll events performed on behalf of the customer business is greater than or equal to a defined number. Using this qualification criterion, the payroll management system provider can ensure that the customer business making the direct deposit payroll request is known and/or has been a customer for a defined period of time. As a specific example, in one embodiment, the payroll management system provider can stipulate that a number of direct deposit payroll events that equates to a six-month period of time, for instance 12 direct deposit payroll events, are required to meet this qualification criterion.

As another example, in one embodiment, one of the qualification criteria is that the number of insufficient fund events over a defined period of time is less than, or equal to, a defined number. Using this qualification criterion, the payroll management system provider can ensure the reliability of the customer business. As a specific example, in one embodiment, the payroll management system provider can stipulate that there can be no insufficient fund events within the last year to meet this qualification criterion. As another example, the payroll management system provider can stipulate that any previous insufficient fund event requires the business customer to contact an agent for the payroll management system provider before any direct deposit payroll limit increase is approved.

As another example, in one embodiment, one of the qualification criteria is that the amount of the total direct deposit payroll funds requested over a defined time frame, including the present request, is less than, or equal to, a defined maximum value. Using this qualification criterion, the payroll management system provider can cap the risk involved. As a specific example, a payroll system management provider can stipulate that the total direct deposit payroll requested over a six day period is less than or equal to $300,000.00.

As another example, in one embodiment, one of the qualification criteria is that the amount of the total direct deposit payroll funds being requested in a defined time frame, including the present request, is less than or equal to a defined multiple of the current direct deposit payroll limit in the defined time frame. Using this qualification criterion, the payroll management system provider can ensure the request appears to be a reasonable/realistic increase. As a specific example, in one embodiment, the payroll management system provider can stipulate that the currently requested direct deposit payroll brings the total direct deposit payroll funds to less than twice the current direct deposit payroll limit for the a defined time frame, such as a six day period.

As another example, in one embodiment, one of the qualification criteria is that the amount of the total direct deposit funds being requested for an individual account in a defined time frame, including the present request, is less than or equal to a defined maximum value for an individual account. Using this qualification criterion, the payroll management system provider can cap the risk involved. As a specific example, a payroll system management provider can stipulate that the limit for an individual account is $30,000.00 in a given six day period.

As another example, in one embodiment, one of the qualification criteria is that the amount of the total direct deposit funds being requested for an individual account, including the present request, is less than or equal to a defined multiple of the current total direct deposit limit for an individual account in the defined time frame. Using this qualification criterion, the payroll management system provider can ensure the request appears to be a reasonable/realistic increase. As a specific example, in one embodiment, the payroll management system provider can stipulate that the amount of the total direct deposit funds being requested for an individual account is less than or equal to twice the current direct deposit limit for the same time frame.

In other embodiments, the qualification criteria are any other criteria as defined and/or desired by the payroll service provider. In addition, in one embodiment, at DEFINE ONE OR MORE QUALIFICATION CRITERIA TO QUALIFY FOR AN AUTOMATED INCREASE OF THE DIRECT DEPOSIT PAYROLL LIMIT OPERATION 205, the payroll management system provider also collects and/or otherwise obtains various other data regarding a given customer business that is of interest and/or of significance to the payroll manager system provider. In one embodiment, this additional data includes, but is not limited to: financial information regarding the customer business such as gross or net value, gross or net revenues, etc.; more detailed historical data regarding previous transactions between the payroll management system provider and the customer business; credit reports/data regarding the customer business; and any other data related to the customer business that is desired, and can be obtained.

In one embodiment, the data representing the qualification criteria for automatic approval of direct deposit payroll increases and any other desired customer business data is collected at DEFINE ONE OR MORE QUALIFICATION CRITERIA TO QUALIFY FOR AN AUTOMATED INCREASE OF THE DIRECT DEPOSIT PAYROLL LIMIT OPERATION 205 by manually entering the data into a computing system, such as computing systems 100, 153 and/or server system 120, of FIG. 1 using a user interface device such as a keyboard, such as keyboards 107, 157, a mouse, such as mice 111, 161, a touch pad, voice recognition software, or any other device capable of providing user input to a computing system and/or for translating user actions into computing system operations, whether known at the time of filing or as developed later. In one embodiment, the meeting resource data is collected by entering the data into a computing system using an entry form and/or interface.

In one embodiment, once the payroll management system provider establishes and/or defines qualification criteria for automatic approval of direct deposit payroll increases and obtains any other desired customer business data at DEFINE ONE OR MORE QUALIFICATION CRITERIA TO QUALIFY FOR AN AUTOMATED INCREASE OF THE DIRECT DEPOSIT PAYROLL LIMIT OPERATION 205, process flow proceeds to STORE THE ONE OR MORE QUALIFICATION CRITERIA AND/OR CUSTOMER HISTORY DATA OPERATION 207.

In one embodiment, at STORE THE ONE OR MORE QUALIFICATION CRITERIA AND/OR CUSTOMER HISTORY DATA OPERATION 207 the data representing the qualification criteria for automatic approval of direct deposit payroll increases and/or any other desired customer business data of DEFINE ONE OR MORE QUALIFICATION CRITERIA TO QUALIFY FOR AN AUTOMATED INCREASE OF THE DIRECT DEPOSIT PAYROLL LIMIT OPERATION 205 is stored, remotely or locally, in whole, or in part, in a database, such as database 170 in FIG. 1, maintained by, accessible by, owned by, or otherwise related to, a provider of process for automatic approval of direct deposit payroll limit increases 200 and/or the user, and/or any third party, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memories 103A, 153A of FIG. 1, or in any main memory or mass memory, associated with a computing device, such as computing systems 100, 150 described above. In one embodiment, the data, in whole, or in part, is stored in any computing device and/or server system, such as computing systems 100, 150 or server system 120, or other device, in another location, or on/in a computer readable medium, and/or any other computer program product, as defined herein. In one embodiment, the data, in whole, or in part, is stored on a webpage, in a web-based system or on a public network such as the Internet.

Returning to FIG. 2, in some embodiments, the data stored as described above is maintained, in whole, or in part, locally or remotely, by: the payroll management system provider; the provider of process for automatic approval of direct deposit payroll limit increases 200; the user; a third party data storage institution; any third party service or institution; or any other parties.

In one embodiment, once the data representing the qualification criteria for automatic approval of direct deposit payroll increases and/or any other desired customer business data of DEFINE ONE OR MORE QUALIFICATION CRITERIA TO QUALIFY FOR AN AUTOMATED INCREASE OF THE DIRECT DEPOSIT PAYROLL LIMIT OPERATION 205 is stored at STORE THE ONE OR MORE QUALIFICATION CRITERIA AND/OR CUSTOMER HISTORY DATA OPERATION 207, process flow proceeds to THE CUSTOMER REQUESTS A DIRECT DEPOSIT PAYROLL THAT EXCEEDS THE CUSTOMER'S DIRECT DEPOSIT PAYROLL LIMIT OPERATION 209.

In one embodiment, at THE CUSTOMER REQUESTS A DIRECT DEPOSIT PAYROLL THAT EXCEEDS THE CUSTOMER'S DIRECT DEPOSIT PAYROLL LIMIT OPERATION 209 a customer business submits a request for a direct deposit payroll to the payroll management system provider that exceeds at least one of the current direct deposit payroll limits.

In one embodiment, the request for a direct deposit payroll to the payroll management system provider plus any other payrolls requested during the defined time frame exceeds the current total direct deposit payroll limits for the defined time frame. In one embodiment, the request for a direct deposit payroll to the payroll management system provider plus any other payrolls requested for an individual account during the defined time frame exceeds the current total direct deposit payroll limits for an individual account for the defined time frame. In one embodiment, the request for a direct deposit payroll to the payroll management system provider exceeds both the current total direct deposit payroll limits and the current total direct deposit payroll limits for an individual account for the defined time frame.

In one embodiment, the request for direct deposit payroll is made to the payroll management system provider by manually entering the data into a computing system, such as computing systems 100, 153 and/or server system 120, of FIG. 1 using a user interface device such as a keyboard, such as keyboards 107, 157, a mouse, such as mice 111, 161, a touch pad, voice recognition software, or any other device capable of providing user input to a computing system and/or for translating user actions into computing system operations, whether known at the time of filing or as developed later. In one embodiment, the request for direct deposit payroll is made through a computing system using an entry form and/or interface.

In one embodiment, once the request for direct deposit payroll is entered into a computing system by the customer business, the request for direct deposit payroll data is received by the payroll management system provider via a computing system, such as computing systems 100, 153 and/or server system 120, of FIG. 1.

In one embodiment, once the request for direct deposit payroll is entered into a computing system by the customer business, the request for direct deposit payroll data is transferred to the payroll management system provider via data on computer program product.

In some embodiments, the request for direct deposit payroll data is transferred to the payroll management system provider through a network of computing systems and/or server systems that is comprised of multiple different computers, wireless devices, cellular telephones, digital telephones, two-way pagers, personal digital assistants, server computers, or any desired combination of these devices, that are coupled using a network, such as network 130 of FIG. 1. As discussed above, network 130 can be any network or network system that is of interest to a user such as a Local Area Network (LAN), a Wide Area Network (WAN), a public network, such as the Internet, a private network, a combination of network types, or other network capable of allowing communication between two or more computing systems, whether available or known at the time of filing or as later developed.

In other embodiments, the request for direct deposit payroll data is transferred to the payroll management system provider through e-mail or through text messaging. In other embodiments, the request for direct deposit payroll data is transferred through any method, apparatus, process or mechanism for transferring and/or viewing data and/or text from one or more devices, computing systems, server systems, databases, web site/web functions and/or any devices having a data storage capability to and/or by one or more other devices, computing systems, server systems, databases, web site/web functions and/or any devices having a data storage capability, whether known at he time of filing or as thereafter developed.

In one embodiment, once a customer business submits a request for a direct deposit payroll to the payroll management system provider that exceeds at least one of the current direct deposit payroll limits at THE CUSTOMER REQUESTS A DIRECT DEPOSIT PAYROLL THAT EXCEEDS THE CUSTOMER'S DIRECT DEPOSIT PAYROLL LIMIT OPERATION 209, process flow proceeds to ANALYZE THE REQUESTED DIRECT DEPOSIT PAYROLL DATA AND/ OR CUSTOMER HISTORY DATA AND COMPARE THE DATA WITH THE QUALIFICATION CRITERIA OPERATION 211.

In one embodiment, at ANALYZE THE REQUESTED DIRECT DEPOSIT PAYROLL DATA AND/OR CUSTOMER HISTORY DATA AND COMPARE THE DATA WITH THE QUALIFICATION CRITERIA OPERATION 211 the data associated with the request for a direct deposit payroll of THE CUSTOMER REQUESTS A DIRECT DEPOSIT PAYROLL THAT EXCEEDS THE CUSTOMER'S DIRECT DEPOSIT PAYROLL LIMIT OPERATION 209 is analyzed in light of the qualification criteria of DEFINE ONE OR MORE QUALIFICATION CRITERIA TO QUALIFY FOR AN AUTOMATED INCREASE OF THE DIRECT DEPOSIT PAYROLL LIMIT OPERATION 205 to determine if the present direct deposit payroll request is potentially eligible for an automatic direct deposit payroll increase.

Methods, processes, means and mechanisms for analyzing and/or comparing data, such as data associated with the request for a direct deposit payroll and qualification criteria data, are well known to those of skill in the art. Consequently, a more detailed discussion of methods, processes, means, and mechanisms for analyzing and/or comparing data, such as data associated with the request for a direct deposit payroll and qualification criteria data, is omitted here to avoid detracting from the invention.

From ANALYZE THE REQUESTED DIRECT DEPOSIT PAYROLL DATA AND/OR CUSTOMER HISTORY DATA AND COMPARE THE DATA WITH THE QUALIFICATION CRITERIA OPERATION 211 process flow proceeds to DOES THE PAYROLL DIRECT DEPOSIT REQUEST MEET THE QUALIFICATION CRITERIA? OPERATION 213.

In one embodiment, at DOES THE PAYROLL DIRECT DEPOSIT REQUEST MEET THE QUALIFICATION CRITERIA?OPERATION 213 a determination is made as to whether the request for a direct deposit payroll that exceeds at least one of the current direct deposit payroll limits made at THE CUSTOMER REQUESTS A DIRECT DEPOSIT PAYROLL THAT EXCEEDS THE CUSTOMER'S DIRECT DEPOSIT PAYROLL LIMIT OPERATION 209 meets the criteria established by the payroll management system provider at DEFINE ONE OR MORE QUALIFICATION CRITERIA TO QUALIFY FOR AN AUTOMATED INCREASE OF THE DIRECT DEPOSIT PAYROLL LIMIT OPERATION 205.

In one embodiment, if at DOES THE PAYROLL DIRECT DEPOSIT REQUEST MEET THE QUALIFICATION CRITERIA? OPERATION 213 it is determined that the request for a direct deposit payroll that exceeds at least one of the current direct deposit payroll limits made at THE CUSTOMER REQUESTS A DIRECT DEPOSIT PAYROLL THAT EXCEEDS THE CUSTOMER'S DIRECT DEPOSIT PAYROLL LIMIT OPERATION 209 meets the criteria established by the payroll management system provider at DEFINE ONE OR MORE QUALIFICATION CRITERIA TO QUALIFY FOR AN AUTOMATED INCREASE OF THE DIRECT DEPOSIT PAYROLL LIMIT OPERATION 205, then process flow proceeds to AUTOMATICALLY INCREASE THE PAYROLL DIRECT DEPOSIT LIMIT FOR THE CUSTOMER AND APPROVE THE REQUEST OPERATION 215.

In one embodiment, at AUTOMATICALLY INCREASE THE PAYROLL DIRECT DEPOSIT LIMIT FOR THE CUSTOMER AND APPROVE THE REQUEST OPERATION 215 the direct deposit payroll limit for the customer business is automatically increased and the direct deposit payroll request is approved without further input from the customer business.

In one embodiment, the total direct deposit payroll limit is increased to accommodate a direct deposit payroll request that exceeds the old total direct deposit payroll limits. In one embodiment, the total direct deposit payroll limits for an individual account are increased to accommodate a direct deposit payroll request that exceeds the old total direct deposit payroll limits for an individual account. In one embodiment, the total direct deposit payroll limit is increased and the total direct deposit payroll limits for an individual account are increased to accommodate a direct deposit payroll request that exceeds both the old total direct deposit payroll limits and the old total direct deposit payroll limits for an individual account.

In one embodiment, if the qualification criteria are met, the customer business is given a new direct deposit payroll limit that is large enough to meet the needs of the currently requested direct deposit payroll and that also includes a buffer amount such as, in one embodiment, a ten percent additional increase. Consequently, not only is efficiency increased by the customer business being automatically granted the requested direct deposit payroll limit increase, but efficiency is further increased by the fact that the buffer amount also helps eliminate the need to continually update the direct deposit payroll limit in the event of relatively insignificant fluctuations in the payroll of the customer business.

In one embodiment, once the direct deposit payroll limit increase is approved, a notation is made in the customer business's electronic file with the payroll management system provider so that agents of the payroll management system provider and/or other parties associated with the payroll service provider can readily see that the direct deposit payroll limit has been increased. This helps avoid multiple increases in the same timeframe.

In one embodiment, once the direct deposit payroll limit for the customer business is automatically increased and the direct deposit payroll request is approved without further input from the customer business at AUTOMATICALLY INCREASE THE PAYROLL DIRECT DEPOSIT LIMIT FOR THE CUSTOMER AND APPROVE THE REQUEST OPERATION 215, process flow proceeds to END OPERATION 230 and process for automatic approval of direct deposit payroll limit increases 200 is exited to await the next customer business request for a direct deposit payroll that exceeds at least one of the current direct deposit payroll limits.

In one embodiment, if at DOES THE PAYROLL DIRECT DEPOSIT REQUEST MEET THE QUALIFICATION CRITERIA? OPERATION 213 it is determined that the request for a direct deposit payroll that exceeds at least one of the current direct deposit payroll limits made at THE CUSTOMER REQUESTS A DIRECT DEPOSIT PAYROLL THAT EXCEEDS THE CUSTOMER'S DIRECT DEPOSIT PAYROLL LIMIT OPERATION 209 does not meet the criteria established by the payroll management system provider at DEFINE ONE OR MORE QUALIFICATION CRITERIA TO QUALIFY FOR AN AUTOMATED INCREASE OF THE DIRECT DEPOSIT PAYROLL LIMIT OPERATION 205, then process flow proceeds to DIRECT BUSINESS CUSTOMER TO AGENT OPERATION 217.

In one embodiment, at DIRECT BUSINESS CUSTOMER TO AGENT OPERATION 217 the direct deposit payroll request is denied, the customer business is notified, and/or the customer business is directed to an agent of the payroll management system provider by any means currently used in the art, or as developed hereafter.

In one embodiment, once the direct deposit payroll request is denied, the customer business is notified, and the customer business is directed to an agent of the payroll management system provider at DIRECT BUSINESS CUSTOMER TO AGENT OPERATION 217, process flow proceeds to END OPERATION 230 and process for automatic approval of direct deposit payroll limit increases 200 is exited to await the next customer business request for a direct deposit payroll that exceeds at least one of the current direct deposit payroll limits.

Using process for automatic approval of direct deposit payroll limit increases 200, a payroll service provider is given the capability to automatically approve direct deposit payroll limit increases for proven customer businesses. Consequently, the customer business is provided with better service, while at the same time not increasing the risk to the payroll service provider. In addition, the inventors have found that implementation of one embodiment of the system and method for automatic approval of direct deposit payroll limit increases disclosed herein resulted in a decrease in the number of service calls made to the payroll service provider by customer businesses for the purpose of increasing direct deposit payroll limits of over 60 percent. Consequently payroll service providers implementing process for automatic approval of direct deposit payroll limit increases 200, will often be able to significantly decrease the number of agents required to service their customer businesses, thereby significantly decreasing their operating costs.

The present invention has been described in particular detail with respect to specific possible embodiments. Those of skill in the art will appreciate that the invention may be practiced in other embodiments. For instance, those of skill in the art will readily recognize that the order of operations discussed above was presented for illustrative purposes only and that other orders of operations, and combination of operations, are possible. Consequently, the order of operations discussed above does not limit the invention as claimed.

In addition, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein is merely exemplary, and not mandatory or significant. Consequently, functions performed by a single component may, in some embodiments, be performed by multiple components, and functions performed by multiple components may, in some embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "establishing", "defining", "requesting", "analyzing", "providing", "obtaining", "requesting", "accessing", "selecting", "listing", "determining", "storing", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are shown in an exemplary order for ease of description and understanding. However, those of skill in the art will readily recognize that numerous different orders of operation could be employed. Consequently, the order of operations shown in the FIG.s is illustrative only and does not limit the invention as claimed below.

In addition, the operations shown in the FIG.s are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for automatic approval of direct deposit payroll limit increases comprising:
   one or more computing processors; and
   one or more memories coupled to the one or more computing processors, the one or more memories having stored therein instructions which when executed by the one or more computing processors, perform a process comprising:
   establishing one or more direct deposit payroll limits for a customer business for a defined period of time;
   defining one or more qualification criteria that must be met in order for the customer business to be eligible for an automatic increase of any of the one or more direct deposit payroll limits, the one or more qualification criteria comprising the criterion that the total direct deposit payroll funds requested in the defined period of time, including the direct deposit payroll funds request, must be less than a defined multiple of the total direct deposit payroll limit for the defined period of time, the defined multiple being greater than 1;
   receiving a direct deposit payroll funds request from the customer business, the direct deposit payroll funds request exceeding at least one of the one or more direct deposit payroll limits;
   analyzing the direct deposit payroll funds request to determine if the one or more qualification criteria are met by the direct deposit payroll funds request; and
   if the one or more qualification criteria are met by the direct deposit payroll funds request, automatically increasing at least one of the one or more direct deposit payroll limits for the customer business to a value which is the current total direct deposit payroll limit plus a value of the current direct deposit payroll funds request, plus a buffer amount.

2. The system for automatic approval of direct deposit payroll limit increases of claim 1, wherein;
   the one or more qualification criteria comprises the criterion that the total direct deposit payroll funds requested in the defined period of time, including the direct deposit payroll fund request, must be less than a defined maximum for the defined period of time.

3. The system for automatic approval of direct deposit payroll limit increases of claim 1, wherein;
   establishing one or more direct deposit payroll limits for the customer business comprises establishing a total direct deposit payroll limit for any individual account for a defined period of time.

4. The system for automatic approval of direct deposit payroll limit increases of claim 3, wherein;
   the one or more qualification criteria comprises the criterion that the total direct deposit payroll funds requested for any individual account in the defined period of time, including the direct deposit payroll funds request, must be less than a defined maximum for any individual account for the defined period of time.

5. The system for automatic approval of direct deposit payroll limit increases of claim 3, wherein;
   the one or more qualification criteria that must be met comprises the criterion that the total direct deposit payroll funds requested for any individual account in the defined period of time, including the direct deposit payroll funds request, must be less than a defined multiple of the total direct deposit payroll limit for any individual account for the defined period of time.

6. The system for automatic approval of direct deposit payroll limit increases of claim 1, wherein;
the one or more qualification criteria comprises the criterion that the total number of insufficient funds events involving the customer business in a defined time period is less than, or equal to, a defined number.

7. The system for automatic approval of direct deposit payroll limit increases of claim 1, wherein;
if the one or more qualification criteria are met by the direct deposit payroll request, automatically increasing at least one of the one or more direct deposit payroll fund limits for the customer business comprises increasing the direct deposit payroll fund limits for the customer business by the requested amount plus an additional buffer amount.

8. A system for automatic approval of direct deposit payroll limit increases comprising:
a computing system implemented payroll management system;
and a processor for executing at least part of a process for automatic approval of direct deposit payroll limit increases, the process for automatic approval of direct deposit payroll limit increases comprising:
establishing one or more direct deposit payroll limits for a customer business for a defined period of time;
defining one or more qualification criteria that must be met in order for the customer business to be eligible for an automatic increase of any of the one or more direct deposit payroll limits, the one or more qualification criteria comprising the criterion that the total direct deposit payroll funds requested in the defined period of time, including the direct deposit payroll funds request, must be less than a defined multiple of the total direct deposit payroll limit for the defined period of time, the defined multiple being greater than 1;
receiving a direct deposit payroll funds request from the customer business, the direct deposit payroll funds request exceeding at least one of the one or more direct deposit payroll limits;
analyzing the direct deposit payroll funds request to determine if the one or more qualification criteria are met by the direct deposit payroll funds request; and
if the one or more qualification criteria are met by the direct deposit payroll funds request, automatically increasing at least one of the one or more direct deposit payroll limits for the customer business to a value which is the current total direct deposit payroll limit plus a value of the current direct deposit payroll funds request, plus a buffer amount.

9. The system for automatic approval of direct deposit payroll limit increases of claim 8, wherein;
the one or more qualification criteria comprises the criterion that the total direct deposit payroll funds requested in the defined period of time, including the direct deposit payroll fund request, must be less than a defined maximum for the defined period of time.

10. The system for automatic approval of direct deposit payroll limit increases of claim 8, wherein;
establishing one or more direct deposit payroll limits for the customer business comprises establishing a total direct deposit payroll limit for any individual account for a defined period of time.

11. The system for automatic approval of direct deposit payroll limit increases of claim 10, wherein;
the one or more qualification criteria comprises the criterion that the total direct deposit payroll funds requested for any individual account in the defined period of time, including the direct deposit payroll funds request, must be less than a defined maximum for any individual account for the defined period of time.

12. The system for automatic approval of direct deposit payroll limit increases of claim 10, wherein;
the one or more qualification criteria that must be met comprises the criterion that the total direct deposit payroll funds requested for any individual account in the defined period of time, including the direct deposit payroll funds request, must be less than a defined multiple of the total direct deposit payroll limit for any individual account for the defined period of time.

13. The system for automatic approval of direct deposit payroll limit increases of claim 8, wherein;
the one or more qualification criteria comprises the criterion that the number of previously successful payroll events processed for the customer business must be equal to, or greater than, a defined number.

14. The system for automatic approval of direct deposit payroll limit increases of claim 8, wherein;
the one or more qualification criteria comprises the criterion that the total number of insufficient funds events involving the customer business in a defined time period is less than, or equal to, a defined number.

15. The system for automatic approval of direct deposit payroll limit increases of claim 8, wherein;
if the one or more qualification criteria are met by the direct deposit payroll request, automatically increasing at least one of the one or more direct deposit payroll fund limits for the customer business comprises increasing the direct deposit payroll fund limits for the customer business by the requested amount plus an additional buffer amount.

16. A computer program product for automatic approval of direct deposit payroll limit increases comprising:
a nontransitory computer readable medium;
and computer program code, encoded on the computer readable medium, comprising computer readable instructions for:
establishing one or more direct deposit payroll limits for a customer business for a defined period of time;
defining one or more qualification criteria that must be met in order for the customer business to be eligible for an automatic increase of any of the one or more direct deposit payroll limits, the one or more qualification criteria comprising the criterion that the total direct deposit payroll funds requested in the defined period of time, including the direct deposit payroll funds request, must be less than a defined multiple of the total direct deposit payroll limit for the defined period of time, the defined multiple being greater than 1;
receiving a direct deposit payroll funds request from the customer business, the direct deposit payroll funds request exceeding at least one of the one or more direct deposit payroll limits;
analyzing the direct deposit payroll funds request to determine if the one or more qualification criteria are met by the direct deposit payroll funds request; and
if the one or more qualification criteria are met by the direct deposit payroll funds request, automatically increasing at least one of the one or more direct deposit payroll limits for the customer business to a value which is the current total direct deposit payroll limit plus a value of the current direct deposit payroll funds request, plus a buffer amount.

17. The computer program product for automatic approval of direct deposit payroll limit increases of claim 16, wherein;
   the one or more qualification criteria comprises the criterion that the total direct deposit payroll funds requested in the defined period of time, including the direct deposit payroll fund request, must be less than a defined maximum for the defined period of time.

18. The computer program product for automatic approval of direct deposit payroll limit increases of claim 16, wherein;
   establishing one or more direct deposit payroll limits for the customer business comprises establishing a total direct deposit payroll limit for any individual account for a defined period of time.

19. The computer program product for automatic approval of direct deposit payroll limit increases of claim 18, wherein;
   the one or more qualification criteria comprises the criterion that the total direct deposit payroll funds requested for any individual account in the defined period of time, including the direct deposit payroll funds request, must be less than a defined maximum for any individual account for the defined period of time.

20. The computer program product for automatic approval of direct deposit payroll limit increases of direct deposit payroll limit increases of claim 18, wherein;
   the one or more qualification criteria that must be met comprises the criterion that the total direct deposit payroll funds requested for any individual account in the defined period of time, including the direct deposit payroll funds request, must be less than a defined multiple of the total direct deposit payroll limit for any individual account for the defined period of time.

21. The computer program product for automatic approval of direct deposit payroll limit increases of claim 16, wherein;
   the one or more qualification criteria comprises the criterion that the number of previously successful payroll events processed for the customer business must be equal to, or greater than, a defined number.

22. The computer program product for automatic approval of direct deposit payroll limit increases of claim 16, wherein;
   the one or more qualification criteria comprises the criterion that the total number of insufficient funds events involving the customer business in a defined time period is less than, or equal to, a defined number.

23. The computer program product for automatic approval of direct deposit payroll limit increases of claim 16, wherein;
   if the one or more qualification criteria are met by the direct deposit payroll request, automatically increasing at least one of the one or more direct deposit payroll fund limits for the customer business comprises increasing the direct deposit payroll fund limits for the customer business by the requested amount plus an additional buffer amount.

\* \* \* \* \*